Patented May 22, 1945

2,376,549

UNITED STATES PATENT OFFICE 2,376,549

PRODUCTION OF STYRENE AND BUTADIENE

Julian M. Mavity, Chicago, Ill., assignor to Universal Oil Products Company, Chicago, Ill., a corporation of Delaware No Drawing. Application February 11, 1942, Serial No. 430,513

10 Claims. (Cl. 260—669)

This invention relates to a process for the manufacture of styrene and butadiene by means of catalytic dehydrogenation. More specifically, it is concerned with a process whereby ethylbenzene and normal $C_4$ hydrocarbons are dehydrogenated simultaneously in the presence of a dehydrogenating catalyst to produce a mixture of butadiene and styrene.

The production of synthetic rubber is limited chiefly by the capacities for producing butadiene and styrene, the two principal raw materials employed in the manufacture of synthetic rubber. For this reason, processes which produce appreciable amounts of butadiene and styrene from relatively cheap charging materials are in great need at the present time.

I have found, however, that both butadiene and styrene may be simultaneously produced in a single reaction zone by contacting normal $C_4$ hydrocarbons and ethylbenzene with a dehydrogenating catalyst at conditions which are optimum for the dehydrogenation of each of the starting materials. As a result of my invention it is possible, therefore, to produce both of the principal starting materials for synthetic rubber in a single dehydrogenation plant, thereby obviating the necessity for constructing and operating two plants, one for the production of butadiene and the other for the production of styrene. I have found that the optimum conditions for butadiene production from normal butene in the presence of a dehydrogenation catalyst are practically the same as the optimum conditions for the production of styrene from ethylbenzene, and it is this fact which makes the simultaneous dehydrogenation process feasible.

In one specific embodiment, the present invention relates to a process for the simultaneous production of butadiene and styrene from $C_4$ hydrocarbons and ethylbenzene, respectively, which comprises contacting a combined feed comprising $C_4$ hydrocarbons and ethylbenzene with a dehydrogenation catalyst at a preferred temperature within the approximate range of 450 to 750° C. for a sufficient length of time to effect the formation of butadiene and styrene, maintaining throughout the entire reaction period a total hydrocarbon partial pressure of less than one atmosphere and separating from the resultant product of dehydrogenation a butadiene fraction and a styrene fraction.

Catalysts which have been found suitable for effecting dehydrogenation reactions such as the dehydrogenation of butanes and ethylbenzene comprise oxides of the metals of the left hand column of groups IV, V, and VI of the periodic table deposited on refractory supports. The preferred catalyst for my operation comprises chromia, molybdena, or vanadia deposited on alumina in varying proportions used either with or without a stabilizing oxide, such as magnesia. These catalysts may be prepared by impregnating a suitable refractory support with an aqueous solution of a compound of the desired metallic element, followed by calcination of the impregnated mass at a high temperature in order to effect decomposition of the compound to the oxide. More specifically, a solution of chromic acid may be used to impregnate alumina and the resulting catalytic mass calcined at a temperature of about 500° C. or higher to produce an active dehydrogenating catalyst.

The process of my invention may be conducted according to several different methods of operation. For example, the catalyst granules may be disposed in a fixed bed and the hydrocarbon vapors passed through the bed at the proper rate to effect the desired degree of decomposition. According to an alternative method of operation, the catalyst, this time in the powdered form, would be added to a flowing stream of the hydrocarbons and the resulting material passed through a heating coil maintained at reaction temperatures in order to effect dehydrogenation. A third method of operation may also be used; that is, the method in which the hydrocarbon vapors are passed upward through a turbulent suspended bed of powdered catalyst at the proper rate to keep the catalyst in suspension and at the proper temperature to accomplish the desired reactions. It is usually necessary to add heat continuously throughout the dehydrogenation process, since the reaction itself is highly endothermic. The heat may be added either by heat exchange methods, by the superheat of the reactants, or in some cases by the heat content of the catalyst itself.

In any or all of these methods of operation, it is also within the scope of this invention to add a diluent gas to the hydrocarbon feed in order to permit operation at total pressures above one atmosphere and yet to hold the hydrocarbon partial pressures below one atmosphere. Such inert diluents may also be used to carry a substantial portion of the heat required to the reaction zone.

Inasmuch as the dehydrogenation reaction causes a deposition of carbonaceous materials on the catalyst, it is necessary to regenerate the catalyst at frequent intervals in order to keep the activity of the catalyst at a practical high level. In the fixed bed operation, the regeneration may be accomplished by passing an oxygen-containing gas through the bed with a resultant removal of the deposit by combustion. The same sort of regeneration process may also be applied to that type of operation in which the catalyst is kept in a fluid turbulent state by the upwardly rising vapors merely by discontinuing the flow of the hydrocarbon vapors and adding an oxygen-containing gas. In either of the powdered catalyst processes, however, it may be desirable to remove the spent catalyst from the reaction zone and regenerate the catalyst in a separate zone; thereafter returning the regenerated catalyst to the dehydrogenation reaction zone.

The preferred temperature in the dehydrogenation zone which I have found to be optimum for the production of both butadiene and styrene ranges from approximately 550 to 700° C. although, as previously mentioned, it may occasionally be desirable to use temperatures above or below this preferred range. I have also found it necessary in order to reduce complicating side reactions and to prevent undue decomposition of the styrene and butadiene which are produced to keep the hydrocarbon partial pressure below one atmosphere, and preferably below approximately 400 millimeters of mercury absolute. It is possible, therefore, either to operate the process under a partial vacuum or to employ diluting gases, such as nitrogen, methane, carbon dioxide, etc., as previously mentioned. The gas hourly space velocities which are employed in this process may vary considerably, depending upon the relative proportions of the charging stocks. Usually, however, the gas hourly space velocities (measured by standard conditions) of the butane-butene fraction alone are within the range from about 100 to 600. After having fixed the space velocity of the butane-butene the liquid hourly space velocity of the ethylbenzene is then fixed by the ratio of butane-butene to ethylbenzene that is employed.

The charging material for this process usually consists of a mixture of $C_4$ hydrocarbons (predominantly normal) and ethylbenzene. The proportions of these materials may be varied considerably, depending upon the relative amounts of styrene and butadiene which it is desired to produce. However, it is preferred to employ the proper proportions so that the ultimate yields of butadiene and styrene will have the approximate weight ratio of about 3 to 1, since it is usually that ratio that is employed in the manufacture of most synthetic rubbers. Alternatively, instead of employing ethylbenzene as the starting material, the styrene hydrocarbon fractions consisting essentially of $C_8$ paraffins or naphthenes which are capable of dehydrocyclization and dehydrogenation to styrene may also be employed. Since such dehydrogenation is usually accompanied by undesirable side reactions, it is preferred to use only ethylbenzene, however, as the source of styrene.

In operating the process of my invention, the reaction products from the dehydrogenation zone may be subjected to any suitable separation and refining process from which butadiene and styrene may be recovered, and unconverted butenes and ethylbenzene returned to the dehydrogenation step. Such a purification operation may involve, for example, stripping and absorbing steps, as well as solvent extraction or azeotropic distillation steps. In this manner, the desired products, butadiene and styrene, may be separated and recovered, and unconverted materials may be returned for further treatment with the catalyst.

The following example is intended to illustrate the operating conditions that may be employed in dehydrogenating a normal butane-butene-ethylbenzene mixture to produce butadiene and styrene.

The mixture of reactants having an aliphatic to aromatic weight ratio of about 4.5 to 1, is contacted with a chromia-alumina dehydrogenation catalyst at a temperature of about 640° C. and at a hydrocarbon partial pressure of approximately 130 millimeters of mercury absolute for sufficient contact time to convert a substantial part of the $C_4$ paraffins and mono-olefins to butadiene and of the ethylbenzene to styrene. The resulting $C_4$ fraction is separated from the liquid fraction by absorption and stripping. Butadiene is then separated from the $C_4$ fraction, and the remaining $C_4$ hydrocarbons are returned to the dehydrogenation zone for further treatment. Styrene is recovered from the liquid hydrocarbon fraction by a low pressure distillation step, and the unconverted ethylbenzene is returned to the dehydrogenation treatment for further conversion.

I claim as my invention:

1. A process for producing synthetic rubber-forming components which comprises subjecting a hydrocarbon feed stock comprising ethylbenzene and a normal $C_4$ hydrocarbon containing at least 8 hydrogen atoms to catalytic dehydrogenation at a temperature in the range of 450–750° C. under a hydrocarbon partial pressure of less than one atmosphere and for a contact time such as to convert substantial portions of the ethylbenzene and the $C_4$ hydrocarbon into styrene and butadiene respectively.

2. A process for producing synthetic rubber-forming components which comprises subjecting a hydrocarbon feed stock comprising ethylbenzene and a normal $C_4$ hydrocarbon containing at least 8 hydrogen atoms to catalytic dehydrogenation at a temperature in the range of 450–750° C. under a hydrocarbon partial pressure of less than one atmosphere and for a contact time such as to convert substantial portions of the ethylbenzene and the $C_4$ hydrocarbon into styrene and butadiene respectively, the ethylbenzene and $C_4$ hydrocarbon content of said feed stock being proportioned so as to produce butadiene and styrene in the approximate weight ratio of about 3 to 1.

3. A process for producing synthetic rubber-forming components which comprises subjecting a hydrocarbon feed stock comprising ethylbenzene and a normal $C_4$ hydrocarbon containing at least 8 hydrogen atoms to catalytic dehydrogenation at a temperature in the approximate range of 550–700° C. under a hydrocarbon partial pressure of less than about 400 millimeters of mercury absolute and for a contact time such as to convert substantial portions of the ethylbenzene and the $C_4$ hydrocarbons into styrene and butadiene respectively.

4. A process for producing synthetic rubber-forming components which comprises subjecting a hydrocarbon feed stock comprising ethylbenzene and a normal $C_4$ hydrocarbon containing at least 8 hydrogen atoms to catalytic dehydrogenation at a temperature in the approximate range of 550–700° C. under a hydrocarbon partial pressure of less than about 400 millimeters of mercury absolute and for a contact time such as to convert substantial portions of the ethylbenzene and the C₄ hydrocarbon into styrene and butadiene respectively, the ethylbenzene and C₄ hydrocarbon content of said feed stock being proportioned so as to produce butadiene and styrene in the approximate weight ratio of about 3 to 1.

5. The process as defined in claim 1 further characterized in that the catalytic dehydrogenation is effected in the presence of an oxide of a metal from the left hand column of group IV of the periodic table.

6. The process as defined in claim 1 further characterized in that the catalytic dehydrogenation is effected in the presence of an oxide of a metal from the left hand column of group V of the periodic table.

7. The process as defined in claim 1 further characterized in that the catalytic dehydrogenation is effected in the presence of an oxide of a metal from the left hand column of group VI of the periodic table.

8. The process as defined in claim 1 further characterized in that the catalytic dehydrogenation is effected in the presence of chromia supported on alumina.

9. A process for producing synthetic rubber-forming components which comprises subjecting a hydrocarbon feed stock comprising ethylbenzene and a normal C₄ hydrocarbon containing at least 8 hydrogen atoms to catalytic dehydrogenation at a temperature in the range of 450–750° C. under a partial pressure of the hydrocarbons subjected to dehydrogenation of less than 1 atmosphere and for a contact time such as to convert substantial portions of the ethylbenzene and the C₄ hydrocarbons into styrene and butadiene respectively.

10. A process for producing synthetic rubber-forming components which comprises subjecting a hydrocarbon feed stock comprising ethylbenzene and a normal C₄ hydrocarbon containing at least 8 hydrogen atoms to catalytic dehydrogenation at a temperature in the range of 450–750° C. under a partial pressure of the hydrocarbons subjected to dehydrogenation of less than about 400 mm. of mercury absolute and for a contact time such as to convert substantial portions of the ethylbenzene and the C₄ hydrocarbons into styrene and butadiene respectively.

JULIAN M. MAVITY.